United States Patent
Zhang et al.

(10) Patent No.: US 11,459,260 B2
(45) Date of Patent: Oct. 4, 2022

(54) SYSTEM AND METHOD FOR TREATING HIGH-SALT HIGH-ORGANIC WASTEWATER AND RECOVERING ENERGY

(71) Applicants: Shenzhen Institutes of Advanced Technology, Chinese Academy of Sciences, Guangdong (CN); Guangzhou Institute of Advanced Technology, Chinese Academy of Sciences, Guangdong (CN)

(72) Inventors: Fengming Zhang, Guangdong (CN); Chuangjian Su, Guangdong (CN); Zhiyu Chen, Guangdong (CN); Yaxin Ding, Guangdong (CN); Shunquan Chen, Guangdong (CN)

(73) Assignees: Shenzhen Institutes of Advanced Technology, Chinese Academy of Sciences, Shenzhen (CN); 2. Guangzhou Institute of Advanced Technology, Chinese Academy of Sciences, Guangzhou (CN)

( * ) Notice: Subject to any disclaimer, the term of this patent is extended or adjusted under 35 U.S.C. 154(b) by 124 days.

(21) Appl. No.: 17/057,113

(22) PCT Filed: Jun. 17, 2019

(86) PCT No.: PCT/CN2019/091473
§ 371 (c)(1),
(2) Date: Nov. 20, 2020

(87) PCT Pub. No.: WO2020/029684
PCT Pub. Date: Feb. 13, 2020

(65) Prior Publication Data
US 2021/0188683 A1 Jun. 24, 2021

(30) Foreign Application Priority Data

Aug. 7, 2018 (CN) .................. 201810893326.X
Aug. 7, 2018 (CN) .................. 201810893327.4

(51) Int. Cl.
*C02F 11/08* (2006.01)
*C02F 1/38* (2006.01)
(Continued)

(52) U.S. Cl.
CPC .............. *C02F 11/086* (2013.01); *C02F 1/38* (2013.01); *C02F 1/385* (2013.01);
(Continued)

(58) Field of Classification Search
None
See application file for complete search history.

(56) References Cited

U.S. PATENT DOCUMENTS 3,549,529 A * 12/1970 Wiseman ................ C02F 11/08
                                                        210/761
4,822,497 A *  4/1989 Hong ................. B01D 11/0203
                                                        210/721

(Continued)

FOREIGN PATENT DOCUMENTS

CN       103508547 A    1/2014
CN       104671388 A    6/2015
(Continued)

OTHER PUBLICATIONS

International search report of PCT Patent Application No. PCT/CN2019/091473 dated Sep. 16, 2019.

*Primary Examiner* — David C Mellon (57) ABSTRACT

The disclosure discloses a system for treating high-salt high-organic wastewater and recovering energy, the system includes a cold wall-type reactor (6), a multi-level cyclone separator (16, 19, and 25), a waste liquid feeding system, an
(Continued)

oxidant feeding system and a fuel feeding system; The cold wall-type reactor designed by the disclosure is formed by inner and outer double-housing structures, a cooling medium is fed into a gap between the inner housing and the outer housing of the reactor, the fluid on an inner wall surface of the inner housing of the reactor is cooled below a supercritical temperature of the water by using countercurrent heat exchange, blockage of the inorganic salts is effectively prevented. The disclosure is capable of realizing gradient utilization of the reaction heat of the high-salt high-organic wastewater supercritical water oxidation system, and improving a system energy recovery utilization ratio in the greatest degree.

12 Claims, 4 Drawing Sheets

(51) Int. Cl.
    *C02F 101/10*    (2006.01)
    *C02F 101/12*    (2006.01)
    *C02F 101/16*    (2006.01)
    *C02F 101/30*    (2006.01)
    *C02F 103/34*    (2006.01)

(52) U.S. Cl.
    CPC .... *C02F 2101/101* (2013.01); *C02F 2101/12* (2013.01); *C02F 2101/16* (2013.01); *C02F 2101/30* (2013.01); *C02F 2103/343* (2013.01); *C02F 2303/10* (2013.01)

(56) References Cited

U.S. PATENT DOCUMENTS

| | | | |
|---|---|---|---|
| 5,384,051 A * | 1/1995 | McGinness | C02F 1/008 210/765 |
| 10,457,579 B2 * | 10/2019 | Zhang | C02F 1/72 |
| 2002/0086150 A1 * | 7/2002 | Hazlebeck | C23C 28/023 423/650 |

FOREIGN PATENT DOCUMENTS

| | | |
|---|---|---|
| CN | 107935287 A | 4/2018 |
| WO | 2012151794 A1 | 11/2012 |

* cited by examiner

SYSTEM AND METHOD FOR TREATING HIGH-SALT HIGH-ORGANIC WASTEWATER AND RECOVERING ENERGY

TECHNICAL FIELD

The disclosure belongs to the technical field of high-salt high-organic wastewater treatment, and specifically relates to a system and method for treating high-salt high-organic wastewater and recovering energy.

BACKGROUND

In industries of pharmaceuticals, chemicals, pesticides, printing and dyeing and the like, a large amount of high-salt high organic hazardous waste liquid, such as mother liquor and evaporation residual liquid, is produced. The content of organic matters in this type of the wastewater is as high as tens of thousands to hundreds of thousands mg/L, and a large amount of toxic and refractory organic matters, such as polycyclic aromatic hydrocarbons, heterocycles, and phenols, are contained. In addition, this type of the waste liquid contains hundreds of thousands or even higher concentration of inorganic salts. In the background of improving environmental protection requirements day by day, not only complete harmless degradation of the organic matters is achieved to this type of the wastewater, but also subsequent treatment of concentrated brine/waste salt residue is imminent. Therefore, a treatment cost per ton of such a hazardous waste is up to thousands or even tens of thousands of RMB Yuan. Traditional zero-discharge/near-zero-discharge treatment of the high-salt high-organic hazardous waste liquid may not achieve effective treatment of the wastes.

Supercritical waste oxidation is a method that an organic matter is "burn"-oxidized by using an oxidant under a condition of exceeding a critical point of water (Pc=22.1 MPa, Tc=374 DEG C.). This technology is capable of, by using unique properties (such as a density, a viscosity, a dielectric constant, reduction of an ion product, weakening of a hydrogen bond, a diffusion ability and significant enhancement of non-polar characteristics) of supercritical water, enabling an organic pollutant to be completely oxidized into non-toxic harmless products such as $CO_2$ and $H_2O$, has unique advantages of a rapid reaction rate, complete degradation, no secondary pollution and the like, and is one of the most potential organic wastewater treatment technologies at present.

Due to the unique advantages of the supercritical waste oxidation technology, lab trial and pilot trial devices of supercritical water oxidation are successively built at home and abroad, but the supercritical water oxidation technology is prevented from being further industrialized and promoted by problems such as corrosion, salt deposition and an excessively high operating cost. The corrosion of a reactor is greatly accelerated by inorganic acids (such as HCl, and $H_2SO_4$) formed in a supercritical water oxidation process and reaction environments of high temperature, high pressure, and high oxygen concentration; most of inorganic salts have a very low solubility in supercritical water, an outlet and a valve of the reactor may be blocked because a lot of the inorganic salts are precipitated in a reaction process, a pressure fluctuation of a system is caused, and finally the shutdown of a supercritical water oxidation system device is caused; and in a supercritical water oxidation operating process, a material needs to be improved to the high temperature and high pressure (generally above the critical point), a large amount of electrical energy is required to be consumed in the process, it is caused that a operating cost of the system is higher.

SUMMARY

In view of this, it is necessary to provide a system and method for treating high-salt high-organic wastewater and recovering energy in allusion to problems, such as corrosion, salt deposition, low or zero utilization rate of heat energy, in an existing high-salt high-organic wastewater treatment technology. A technical scheme of the disclosure is as follows.

In a first aspect, the disclosure provides a system for treating high-salt high-organic wastewater and recovering energy, the system includes a cold wall-type reactor, a multi-level cyclone separator, a waste liquid feeding system, an oxidant feeding system and a fuel feeding system;

the cold wall-type reactor is a double-layer housing structure, the top and bottom of the double-layer housing structure are provided with cooling medium inlets, a side portion of the double-layer housing is provided with a cooling medium outlet, an inner pipe is installed at the center of the top of the double-layer housing structure, the exterior of the inner pipe is provided with an intermediate pipe, the exterior of the intermediate pipe is provided with an outer pipe, the inner pipe, the intermediate pipe and the outer pipe are respectively provided with a waste liquid inlet, an oxidant inlet and a fuel inlet; the bottom of the double-layer housing is further provided with a reaction fluid outlet; the cold wall-type reactor is used to perform a supercritical water oxidation reaction on waste liquid; and the reaction fluid outlet is connected with a buffer tank, a top outlet of the buffer tank is connected with the multi-level cyclone separator;

the multi-level cyclone separator is used to perform steam recovery on a reaction product in the cold wall-type reactor and salt separation and crystallization of inorganic salts;

the waste liquid feeding system includes an organic waste liquid regulating pool, the organic waste liquid regulating pool is connected with the waste liquid inlet on the outer pipe;

the oxidant feeding system includes an oxidant storage tank, the oxidant storage tank is connected with the oxidant inlet on the intermediate pipe; and the fuel feeding system includes a fuel storage tank, the fuel storage tank is connected with the fuel inlet on the inner pipe.

Further, the top and bottom of the double-layer housing are respectively provided with two cooling medium inlets, the side portion of the double-layer housing is provided with two cooling medium outlets, and a connecting line of the two cooling medium inlets at the top is respectively 90 degrees with a connecting line of the two cooling medium inlets at the bottom and a connecting line of the two cooling medium outlets at the side portion.

Further, the two cooling medium inlets at the bottom of the double-layer housing are symmetrically installed at left and right two sides of the reaction fluid outlet by using the reaction fluid outlet as a center.

Further, the inner pipe is 100-200 mm in length, the intermediate pipe is 50-150 mm longer than the inner pipe, and the outer pipe is 50-150 mm longer than the intermediate pipe.

Further, a part, 50-150 mm longer than the intermediate pipe, of the outer pipe is a porous structure.

Further, the multi-level cyclone separator is 2 to 4-level cyclone separators.

Further, the multi-level cyclone separator is a 3-level cyclone separator, and a structure thereof specifically includes: a first heat exchanger, a second heat exchanger, a third heat exchanger, a fourth heat exchanger, a first cyclone separator, a second cyclone separator, a third cyclone separator and a fourth cyclone separator, a discharge port of the first heat exchanger is connected with a feeding port of the first cyclone separator, a water inlet of the first heat exchanger is respectively connected with a water outlet of the first cyclone separator and a water outlet of the fourth heat exchanger; a discharge port of the first cyclone separator is connected with a feeding port of the second heat exchanger, a high pressure steam outlet of the first cyclone separator is connected with a feeding port of the fourth heat exchanger, and a water inlet of the first cyclone separator is connected with a water outlet of the second heat exchanger; a discharge port of the second heat exchanger is connected with a feeding port of the second cyclone separator, and a water inlet of the second heat exchanger is connected with a water outlet of the third heat exchanger; a high pressure steam outlet of the second cyclone separator is connected with a feeding port of the third heat exchanger; a discharge port of the third heat exchanger is connected with a feeding port of the third cyclone separator, and a water outlet of the third heat exchanger is connected with a water inlet of the fourth heat exchanger; and a discharge port of the fourth exchanger is connected with a feeding port of the fourth cyclone separator.

Further, the multi-level cyclone separator further includes a fifth heat exchanger and a sixth heat exchanger, a feeding port of the fifth heat exchanger is connected with a discharge port of the oxidant storage tank, a water inlet of the fifth heat exchanger is connected with a water outlet of the first heat exchanger, a discharge port of the fifth heat exchanger is connected with the oxidant inlet, and a water outlet of the fifth heat exchanger is connected with a water inlet of the third heat exchanger; a feeding port of the sixth heat exchanger is connected with a discharge port of the fuel storage tank, a water inlet of the sixth heat exchanger is connected with a water outlet of the first heat exchanger, a discharge port of the sixth heat exchanger is connected with the fuel inlet, and a water outlet of the sixth heat exchanger is connected with a water inlet of the third heat exchanger.

Further, connecting pipes between the fifth heat exchanger and the oxidant inlet and between the sixth heat exchanger and the fuel inlet are further provided with heaters.

Further, the system further includes a residue removing tank, the residue removing tank is connected with a bottom outlet of the buffer tank.

Further, the system further includes a turbo expander connected with a cooling pipeline of the cold wall-type reactor, and the turbo expander is successively connected with a cooling device, a cooling water circulation pump and a cooling medium pipeline, as to form a cycle.

Further, the turbo expander is further connected with an electric generator for generating electricity through expansion work.

In a second aspect, the disclosure provides a method for treating high-salt high-organic wastewater and recovering energy, the method includes the following steps:

step one, opening the fuel storage tank and the oxidant storage tank, enabling fuel and oxidant to be introduced into the cold wall-type reactor for reacting, at the same time, feeding cooling water between the double-layer housings of the cold wall-type reactor, after temperature and pressure in the cold wall-type reactor exceed a supercritical state point of water, enabling waste liquid to be introduced into the cold wall-type reactor for performing a supercritical water oxidation reaction;

step two, discharging a reaction product from the reaction fluid outlet of the cold wall-type reactor, and entering the buffer tank; and step three, enabling the reaction product in the buffer tank to be introduced into multiple levels of the heat exchangers and cyclone separators, and performing steam recovery and salt separation and crystallization of inorganic salts.

Advantages and beneficial effects of the disclosure are as follows:

1) The cold wall-type reactor designed by the disclosure is formed by inner and outer double-housing structures, the organic waste liquid generates the supercritical water oxidation reaction in the inner housing of the reactor under the effects of the fuel and the oxidant, a large amount of reaction heat is released, and the temperature of reaction fluid is caused to be sharply improved, in order to prevent the inorganic salts from being precipitated in the supercritical water and adhered and deposited on an inner wall of the inner housing of the reactor, a cooling medium such as water is fed into a gap between the inner housing and the outer housing of the reactor, the fluid on an inner wall surface of the inner housing of the reactor is cooled below a supercritical temperature of the water by using countercurrent heat exchange, the inorganic salts are dissolved in subcritical fluid and discharged from the bottom outlet of the reactor, thereby blockage of the inorganic salts is effectively prevented.

2) The disclosure is capable of realizing gradient utilization of the reaction heat of the high-salt high-organic wastewater supercritical water oxidation system, and improving a system energy recovery utilization ratio in the greatest degree. The supercritical water oxidation organic waste liquid may release a large amount of the heat energy, the cooling medium such as the cooling water is used to be injected into the gap between the inner housing and the outer housing of the reactor so that the reaction product is cooled to the subcritical, the cooling water after heat absorption and temperature rise is changed into high temperature high pressure steam, and the steam may further enter the turbo expander for generating the electricity through working, the generated electric energy is used for compensation of electric devices (electric heaters and booster pumps) of the system, the remaining electric energy may be sold to generate revenue. The recovered heat energy of the reaction fluid discharged from the reactor may also be used to pre-heat the fuel and the oxidant. The finally recovered salts may be used as industrial raw materials.

In FIG. 1-7, 1—Fuel storage tank, 2—Oxygen storage tank, 3—Turbo expander, 4—Electric generator, 5—Cooling device, 6—Cold wall-type reactor, 7—Cooling water circulation pump, 8-1# cooling water regulating valve, 9-2# cooling water regulating valve, 10—Buffer tank, 11-1# regulating valve, 12—Residue removing tank, 13-2# regulating valve, 14—First heat exchanger, 15-3# regulating valve, 16—First cyclone separator, 17—Second heat exchanger, 18-4# regulating valve, 19—Second cyclone separator, 20-1# outlet regulating valve, 21-5# regulating valve, 22—Third heat exchanger, 23-2# outlet regulating valve, 24-3# outlet regulating valve, 25—Third cyclone separator, 26-4# outlet regulating valve, 27—Circulating water pump, 28-5# outlet regulating valve, 29-6# regulating valve, 30—Fourth cyclone separator, 31-(4)6# outlet regulating valve, 32-7# regulating valve, 33—Fourth heat exchanger, 34-8# regulating valve, 35—Wastewater regulating pool, 36—Wastewater booster pump, 37-1# heater, 38-2# heater, 39—Fifth heat exchanger, 40—Sixth heat exchanger, 41—Oxygen booster pump, 42—Fuel booster pump, 601—Fuel inlet, 602—Oxygen inlet, 603-1# cooling water outlet, 604—Reactor pressure-bearing housing, 605—Reactor inner housing, 606-1# cooling water inlet, 607—Reaction fluid outlet, 608-2# cooling water inlet, 609-2# cooling water outlet, 6010—Waste liquid inlet, 6011-3# cooling water inlet, 6012-4# cooling water inlet, 6013—Upper flange, 6014—Lower flange, 6015—Bolt, 6001—Inner pipe, 6002—Intermediate pipe, 6003—Outer pipe, and 6004—Porous pipe.

DETAILED DESCRIPTION OF THE EMBODIMENTS

In description of the disclosure, it is to be noted that orientation or position relations indicated by terms "top", "bottom", "side", "inner", "outer" and the like are based on the orientation or position relations as shown in drawings, only used for conveniently describing the disclosure and simplifying the description, rather than indicating or implying that an indicated device or element must have a specific orientation, and be constructed and operated in the specific orientation, therefore it may not be understood as limitation to the disclosure. In addition, unless otherwise clearly specified and limited, terms "linked" and "connected" should be understood broadly, for example, it may be fixed connection, may also be detachable connection, or integral connection; it may be mechanical connection, and may also be electrical connection; it may be direct connection, may also be indirect connection through an intermediate medium, and may also be internal communication between two elements; and it may be wireless connection, and may also be wired connection. The specific meanings of the above terms in the disclosure may be understood by those of ordinary skill in the art according to specific situations.

In addition, in the description of the disclosure, it is to be noted that if specific conditions are not specified in the embodiments, it is performed in accordance with conventional conditions or conditions recommended by a manufacturer. Used reagents or instruments unmarked with the manufacturer are all conventional products that may be purchased commercially.

The disclosure is further described in detail below in combination with the drawings and the specific embodiments, which are explanation rather than limitation to the disclosure.

Embodiment 1

As shown in FIG. 1-7, the embodiment provides a system for treating high-salt high-organic wastewater and recovering energy, the system includes a cold wall-type reactor, a multi-level cyclone separator, a waste liquid feeding system, an oxidant feeding system, a fuel feeding system and a turbo expander 3.

The cold wall-type reactor 6 is a double-layer housing structure, and is a cylinder structure, an inner housing is made of a corrosion-resistant material, and an outer housing is made of a high-temperature high-pressure resistant material. The top and bottom of the double-layer housing structure are both provided with 2 cooling medium inlets (a 6011-3# cooling water inlet, a 6012-4# cooling water inlet, a 606-1# cooling water inlet and a 608-2# cooling water inlet successively, a 1# cooling water regulating valve 8 is respectively connected with the 3# cooling water inlet 6011 and the 4# cooling water inlet 6012; and a 2# cooling water regulating valve 9 is respectively connected with the 1# cooling water inlet 606 and the 2# cooling water inlet 608), and the cooling water inlets at the top and bottom are symmetrical by respectively using the top and bottom as a center of a circle; and 603 and 602 are symmetrically installed at left and right two sides by using a reaction fluid outlet 607 at the bottom of the cold wall-type reactor 6 as a center. In the embodiment, a connecting line of the two cooling medium inlets (6011 and 6012) at the top is respectively 90 degrees with a connecting line of the two cooling medium inlets (606 and 608) at the bottom and a connecting line of the two cooling medium outlets (603 and 609) at the side portion, such a design method is capable of reducing a heat transfer temperature difference of the top and bottom, reducing heat exchange loss, and greatly improving cooling efficiency of the cold wall-type reactor 6.

Figure 2:
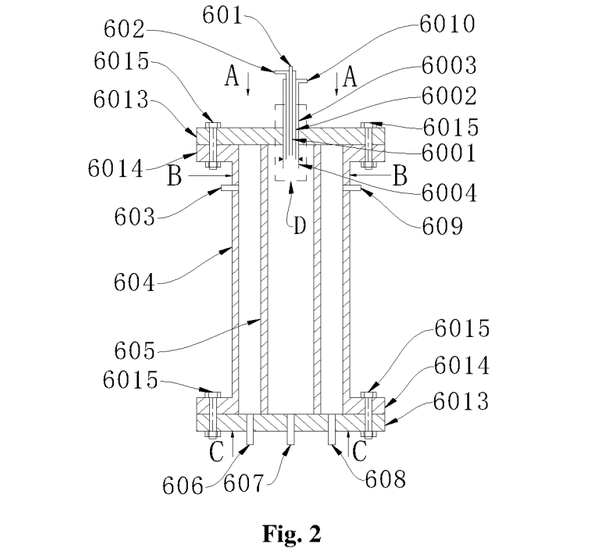
FIG. 2 is a structure schematic diagram of a cold wall-type reactor of the disclosure.
Figure 3:
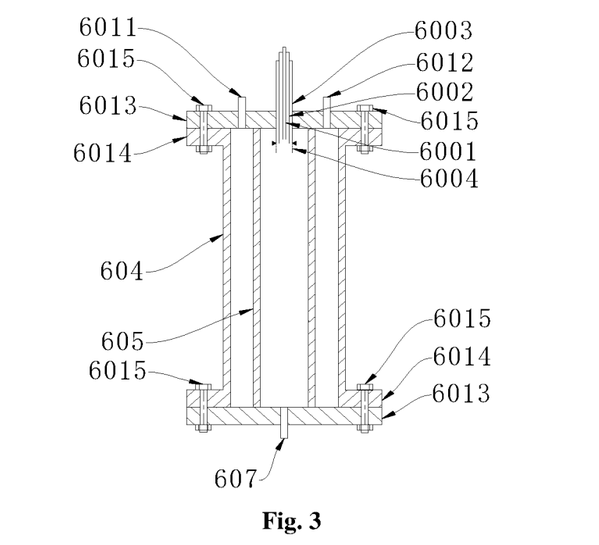
FIG. 3 is another structure schematic diagram of the cold wall-type reactor of the disclosure.
Figure 4:
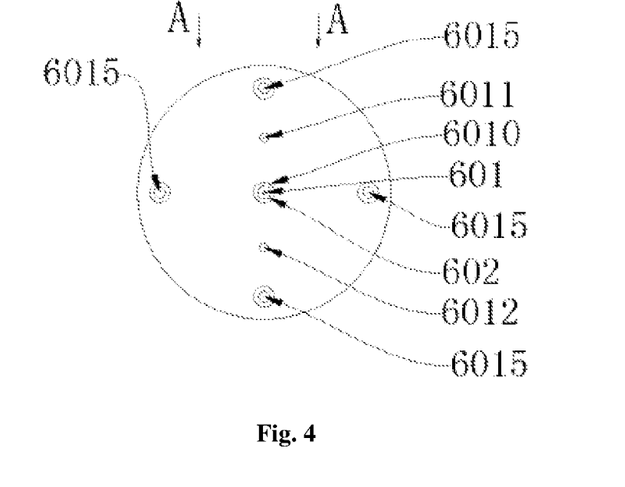
FIG. 4 is a view of an A-A plane in FIG. 2.
Figure 5:
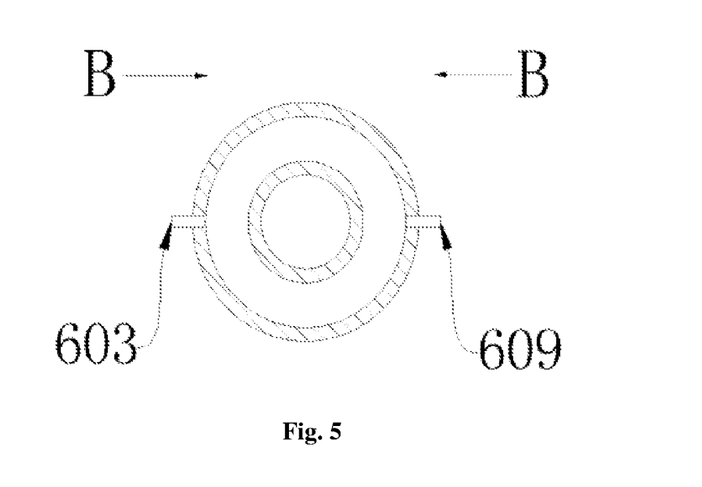
FIG. 5 is a view of a B-B plane in FIG. 2.
Figure 6:
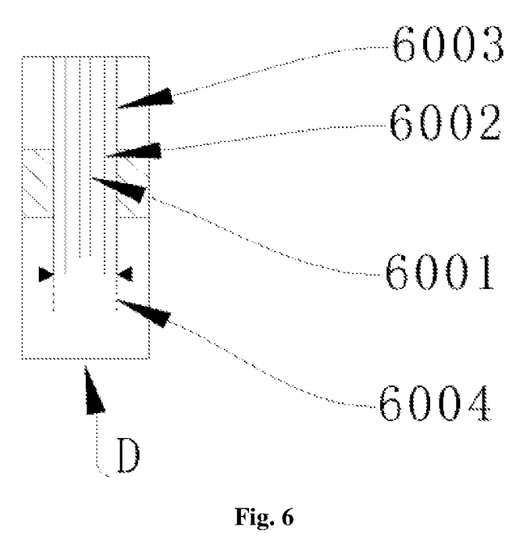
FIG. 6 is a local enlarged view of a place D in FIG. 2.
Figure 7:
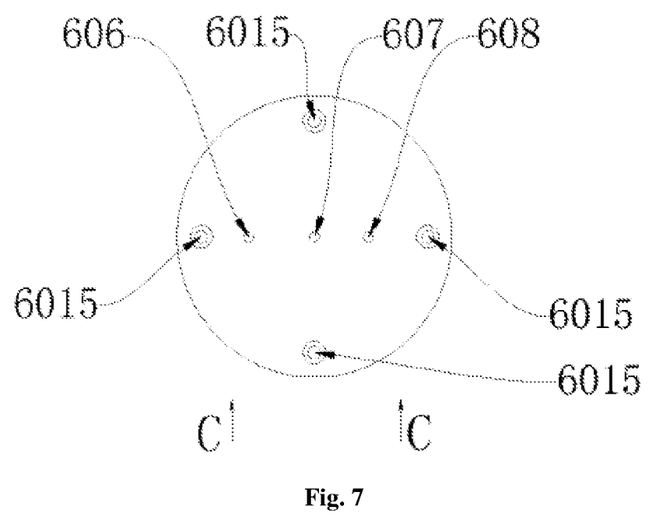
FIG. 7 is a view of a C-C plane in FIG. 2.

An inner pipe 6001 is installed at the center of the top of the double-layer housing structure, the exterior of the inner pipe 6001 is provided with an intermediate pipe 6002, the exterior of the intermediate pipe 6002 is provided with an outer pipe 6003, the inner pipe 6001, the intermediate pipe 6002 and the outer pipe 6003 are respectively provided with a waste liquid inlet 6010, an oxidant inlet 602 and a fuel inlet 601; and in the embodiment, the inner pipe 6001 is 100-200 mm in length, the intermediate pipe 6002 is 50-150 mm longer than the inner pipe 6001, and the outer pipe 6003 is 50-150 mm longer than the intermediate pipe 6002. In addition, a part, 50-150 mm longer than the intermediate pipe 6002, of the outer pipe 6003 is a porous structure. The bottom of the double-layer housing is further provided with a reaction fluid outlet 607; the cold wall-type reactor 6 is used for performing a supercritical water oxidation reaction on three materials of the waste liquid feeding system, the oxidant feeding system and the fuel feeding system; and the reaction fluid outlet 607 is connected with a buffer tank 10, a top outlet of the buffer tank 10 is connected with the multi-level cyclone separator, and a bottom outlet is connected with a residue removing tank 12, a connecting pipeline of the buffer tank 10 and the residue removing tank 12 is provided with a 1# regulating valve 11, and an outlet of the residue removing tank 12 is provided with a 2# regulating valve 13.

Figure 1:
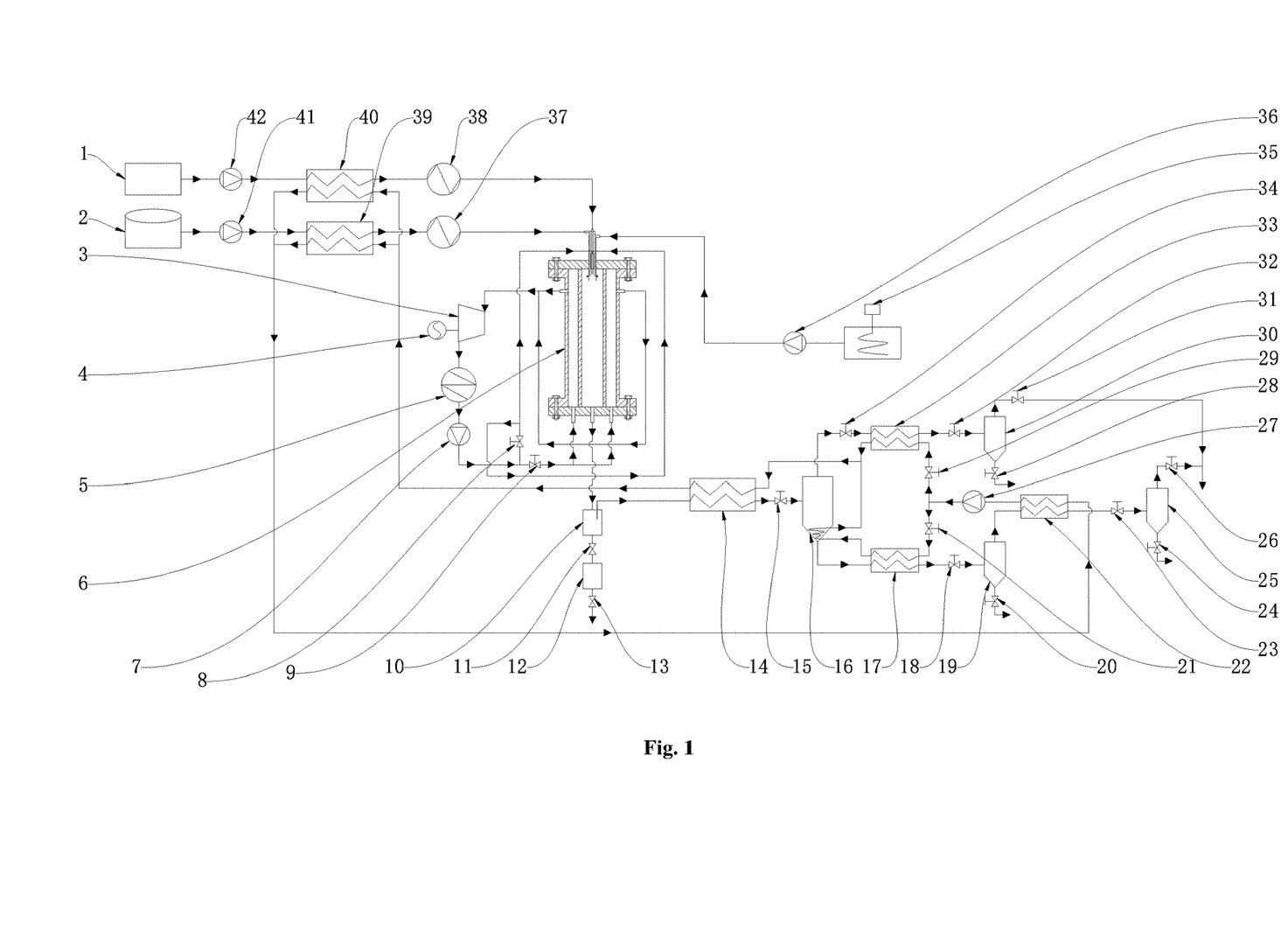
FIG. 1 is a structure schematic diagram of a system for treating high-salt high-organic wastewater and recovering energy of the disclosure.

In the embodiment, the multi-level cyclone separator is a 3-level cyclone separator, and a structure thereof specifically includes: a first heat exchanger 14, a second heat exchanger 17, a third heat exchanger 22, a fourth heat exchanger 33, a first cyclone separator 16, a second cyclone separator 19, a third cyclone separator 25 and a fourth cyclone separator 30, a discharge port of the first heat exchanger 14 is connected with a feeding port of the first cyclone separator 16, a water inlet of the first heat exchanger 14 is respectively connected with a water outlet of the first cyclone separator 16 and a water outlet of the fourth heat exchanger 33; a discharge port of the first cyclone separator 16 is connected with a feeding port of the second heat exchanger 17, a high pressure steam outlet of the first cyclone separator 16 is connected with a feeding port of the fourth heat exchanger 33, and a water inlet of the first cyclone separator 16 is connected with a water outlet of the second heat exchanger 17; a discharge port of the second heat exchanger 17 is connected with a feeding port of the second cyclone separator 19, and a water inlet of the second heat exchanger 17 is connected with a water outlet of the third heat exchanger 22; a high pressure steam outlet of the second cyclone separator 19 is connected with a feeding port of the third heat exchanger 22; a discharge port of the third heat exchanger 22 is connected with a feeding port of the third cyclone separator 25, and a water outlet of the third heat exchanger 22 is connected with a water inlet of the fourth heat exchanger 33; and a discharge port of the fourth exchanger 33 is connected with a feeding port of the fourth cyclone separator 30. The multi-level cyclone separator further includes a fifth heat exchanger 39 and a sixth heat exchanger 40, a feeding port of the fifth heat exchanger 39 is connected with a discharge port of the oxidant storage tank 2, a water inlet of the fifth heat exchanger 39 is connected with a water outlet of the first heat exchanger 14, a discharge port of the fifth heat exchanger 39 is connected with the oxidant inlet 602, and a water outlet of the fifth heat exchanger 39 is connected with a water inlet of the third heat exchanger 22; a feeding port of the sixth heat exchanger 40 is connected with a discharge port of the fuel storage tank 1, a water inlet of the sixth heat exchanger 40 is connected with a water outlet of the first heat exchanger 14, a discharge port of the sixth heat exchanger 40 is connected with the fuel inlet 601, and a water outlet of the sixth heat exchanger 40 is connected with a water inlet of the third heat exchanger 22. Connecting pipes between the fifth heat exchanger 39 and the oxidant inlet 602 and between the sixth heat exchanger 40 and the fuel inlet 601 are further provided with heaters (37 and 38). Regulating valves are installed between the above heat exchangers and the cyclone separators, and at the outlets of the cyclone separators.

The waste liquid feeding system includes an organic waste liquid regulating pool 35 and a wastewater booster pump 36 connected with the organic waste liquid regulating pool 35, the wastewater booster pump 36 is connected with the waste liquid inlet 6010.

The oxidant feeding system includes the oxidant storage tank 2 and an oxidant booster pump 41, the oxidant booster pump 41 is connected with a feeding port of the fifth heat exchanger 39, and in the embodiment, oxidant is oxygen.

The fuel feeding system includes the fuel storage tank 1 and a fuel booster pump 42, the fuel booster pump 42 is connected with a feeding port of the sixth heat exchanger 40. Fuel may be methyl alcohol, glycerol or a mixture of two parties.

The turbo expander 3 is successively connected with a cooling device 5, a cooling water circulation pump 7 and a cooling medium pipeline, as to form a cycle, the cooling water circulation pump 7 is respectively connected with the 1# cooling water regulating valve 8 and the 2# cooling water regulating valve 9. The turbo expander 3 is further connected with an electric generator 4 for generating electricity through expansion work.

Embodiment 2

The device in Embodiment 1 is used for treating high-salt high-organic wastewater and recovering energy, the waste-water is from certain chemical wastewater, and main salts thereof are sodium chloride and sodium sulfate, indexes before and after wastewater treatment are as shown in Table 1, a method for specifically treating and recovering the energy is as follows:

(1) glycerol fuel in a fuel storage tank 1 is pressurized to a supercritical pressure by a fuel booster pump 42 and then enters a sixth heat exchanger 40 to absorb heat and rise temperature, and then continues to absorb the heat and rise the temperature in a 2# heater 38 and is injected into a cold wall-type reactor 6 through a fuel inlet 601; oxygen in an oxygen pipe 2 is pressurized by an oxygen booster pump 41 and then enters a fifth heat exchanger 39 to absorb heat and rise temperature to 350 DEG C., and continues to absorb the heat and rise the temperature in a 1# heater 37 and is injected into the cold wall-type reactor 6 through an oxygen inlet 602, the fuel firstly contacts with the oxygen and performs a violent oxidation reaction and releases a large amount of heat, as to form high temperature reaction fluid with 600-800 DEG C. of temperature; after high-salt high-organic waste liquid is homogenized in a wastewater regulating pool 35, it enters a wastewater booster pump 36, and then is pressurized to the supercritical pressure and injected into the cold wall-type reactor 6 through a waste liquid inlet 6010, high temperature reaction fluid is mixed with low temperature waste liquid through jet entrainment, and the waste liquid is rapidly pre-heated to 350-450 DEG C. through intensive mixing. In addition, due to a porous structure of an outer pipe, the high temperature reaction fluid at the center sucks an unreacted organic matter and the oxygen outside the pipe into a reaction space formed by the outer pipe and an outlet of an intermediate pipe again through the jet entrainment, efficient degradation of the waste liquid and efficient utilization of the oxygen are realized;

(2) cooling water is injected into a gap between a reactor inner housing 605 and a reactor pressure-bearing outer housing 604 for heat exchange through a 1# cooling water inlet 606, a 2# cooling water inlet 608, a 3# cooling water inlet 6011 and a 4# cooling water inlet 6012 and a supercritical oxidation reaction product is cooled to subcritical, the cooling water after heat absorption and temperature rise is changed into high temperature high pressure steam which is discharged through a 1# cooling water outlet 603 and a 2# cooling water outlet 609, and then the steam enters a turbo expander 3 for working and drives an electric generator 4 for generating electricity, generated electric energy is used for compensation of electric devices (electric heaters and booster pumps) of the system, and the remaining electric energy may be sold to generate revenue; the steam after working enters a cooling device 5 for condensing the cooling water; after being supplied and pressurized by 7, the cooling water is injected into the gap between the reactor inner housing 605 and the reactor pressure-bearing outer housing 604 for completing a cycle through the 1# cooling water inlet 606, the 2# cooling water inlet 608, the 3# cooling water inlet 6011 and the 4# cooling water inlet 6012, and the flow rate of the cooling water which is injected from upper portion and lower portion of the reactor is regulated by a 1# cooling water regulating valve and a 2# cooling water regulating valve;

(3) in a process of the supercritical water oxidation reaction, reaction fluid discharged from a reaction product outlet 607 at the bottom of the cold wall-type reactor enters a buffer tank 10, namely the reaction fluid is discharged while the reaction is performed, so that it is guaranteed that the supercritical water oxidation reaction is continuously uninterruptedly performed, solid residue in the reaction product is deposited at the bottom of the buffer tank 10 under the action of gravity, after running for a period of time, a 2# regulating valve 13 is closed, and a 1# regulating valve 11 is opened, the solid residue at the bottom of the buffer tank 10 enters a residue removing tank 12, when the storage volume of inorganic salts reaches a certain level, the 1# regulating valve 11 is closed, and the 2# regulating valve 13 is opened for removing the residue; the reaction fluid discharged from a top end of the buffer tank 10 releases heat and is cooled in a first heat exchanger 14, and then through 2-level flash evaporation, steam recovery and salt separation and crystallization of the inorganic salts are realized. It mainly utilizes a sensitivity difference of solubility of the inorganic salts in a phase change region affected by the temperature under high pressure condition, the solubility of $Na_2SO_4$ in the waste liquid is rapidly reduced by several orders of magnitude in a phase change process, but the solubility of NaCl is slowly reduced. High-salt solution after the supercritical reaction is cooled and depressurized by a 3# regulating valve 15, and then flash-evaporated into a first cyclone separator 16, most of the NaCl is still dissolved in the high pressure steam, and almost all of the $Na_2SO_4$ is precipitated. Precipitated $Na_2SO_4$ inorganic salt particles are initially cooled to form slurry and discharged from the bottom of the first cyclone separator 16, the slurry is further cooled through a second heat exchanger 17 and further depressurized in a 4# regulating valve 18, and then enters a second cyclone separator 19 for separating; separated fluid is cooled in a third heat exchanger 22 and depressurized in a 2# outlet regulating valve 23, and then enters a third cyclone separator 25 for separating continuously; the remaining NaCl in the original high-salt solution is dissolved in the high pressure steam, the fluid in the first cyclone separator 16 is discharged from the top, and then cooled and depressurized through a 8# regulating valve 34, a fourth heat exchanger 33 and a 7# regulating valve 32 successively and further separated in a fourth cyclone separator 30 to obtain the steam and the inorganic salts, finally the reaction fluid is cooled and depressurized and cyclone-separated, to obtain the steam, recycling of the inorganic salts is realized; a 1# outlet regulating valve 20 has an effect of regulating a back pressure of the second cyclone separator 19; similarly, a 3# outlet regulating valve 24 and a 4# outlet regulating valve 26 have an effect of regulating a back pressure of the third cyclone separator 25; a 5# outlet regulating valve 28 and a 6# outlet regulating valve 31 regulate a back pressure of the fourth cyclone separator 30; the performances of the cyclone separators are guaranteed; and the recovered sodium chloride and sodium sulfate may be used as industrial raw materials;

(4) the cooling water is pressurized by a circulating water pump 27 and then respectively enters the second heat exchanger 17 and the fourth heat exchanger 33 for absorbing the heat through the 5# regulating valve 21 and the 6# regulating valve 29; the cooling water in the second heat exchanger 17 enters the first cyclone separator 16 for further absorbing the heat, and then is merged with the cooling water discharged from the fourth heat exchanger 33 to enter the first heat exchanger 14 for continuously absorbing the heat and rising the temperature, respectively enters the sixth heat exchanger 40 and the fifth heat exchanger 39 for pre-heating fuel and oxidant, and then respectively enters the third heat exchanger 22, finally enters the circulating water pump 27 to complete a cycle.

Embodiment 3

The device in Embodiment 1 is used for treating high-salt high-organic wastewater and recovering energy, the wastewater is from certain pharmaceutical wastewater, and main salts thereof are potassium chloride, sodium chloride and sodium sulfate, indexes before and after wastewater treatment are as shown in Table 1, a method for specifically treating and recovering the energy is the same as Embodiment 2, and a difference from Embodiment 2 is as follows: in the step (1), waste liquid is rapidly pre-heated to 430 DEG C. through intensive mixing.

Embodiment 4

The device in Embodiment 1 is used for treating high-salt high-organic wastewater and recovering energy, the wastewater is from certain printing and dyeing wastewater, and main salts thereof are potassium chloride, sodium chloride and sodium sulfate, indexes before and after wastewater treatment are as shown in Table 1, a method for specifically treating and recovering the energy is the same as Embodiment 2, and a difference from Embodiment 2 is as follows: in the step (1), waste liquid is rapidly pre-heated to 380 DEG C. through intensive mixing.

TABLE 1

Indexes before and after wastewater treatment

| | COD | | $NH_3$—N Ammonia | |
| --- | --- | --- | --- | --- |
| Case | COD content in wastewater (mg/L) | Removal rate (%) | nitrogen content in wastewater (mg/L) | Removal rate (%) |
| Embodiment 2 | 250000 | 99.98 | 2500 | 98.4 |
| Embodiment 3 | 100000 | 99.95 | 1500 | 97.3 |
| Embodiment 4 | 400000 | 99.99 | 3000 | 98.7 |

It is indicated from data in Table 1 that, through using the methods of Embodiments 2-4 to treat the high-salt high-organic wastewater and recover the energy, the COD removal rates in different types of wastewater may reach 99.95% or more, and the ammonia nitrogen removal rates may reach 97% or more.

In conclusion, the cold wall-type reactor designed by the disclosure is formed by inner and outer double-housing structures, the organic waste liquid generates the supercritical water oxidation reaction in the inner housing of the reactor under the effects of the fuel and the oxidant, a large amount of reaction heat is released, and the temperature of reaction fluid is caused to be sharply improved, in order to prevent the inorganic salts from being precipitated in the supercritical water and adhered and deposited on an inner wall of the inner housing of the reactor, cooling medium such as water is fed into a gap between the inner housing and the outer housing of the reactor, the fluid on an inner wall surface of the inner housing of the reactor is cooled below a supercritical temperature of the water by using counter-current heat exchange, the inorganic salts are dissolved in subcritical fluid and discharged from the bottom outlet of the reactor, thereby blockage of the inorganic salts is effectively prevented. In addition, a part, longer than the intermediate pipe, of the outer pipe at the top of the cold wall-type reactor is designed as a porous structure, through utilizing the jet entrainment effect of the high pressure waste liquid, the wastewater diffused to a top area of the reactor is sucked into a supercritical reaction area by the porous structure, and the organic matters are completely oxidized and degraded.

Finally, annular space cooling medium injection ports between the reactor inner housing and outer housing are installed at the top and bottom of the reactor and distributed in 90 degrees, another annular space cooling water outlet is installed at the side and distributed in 90 degrees with a cooling water injection port at the top of the reactor, such a design method is capable of greatly improving a rate of temperature fall and cooling efficiency. Furthermore, the disclosure is capable of realizing gradient utilization of the reaction heat of the high-salt high-organic wastewater supercritical water oxidation system, and improving a system energy recovery utilization ratio in the greatest degree. The supercritical water oxidation organic waste liquid may release a large amount of the heat energy, the cooling medium such as the cooling water is used to be injected into the gap between the inner housing and the outer housing of the reactor so that the reaction product is cooled to the subcritical, the cooling water after heat absorption and temperature rise is changed into high temperature high pressure steam, and the steam may further enter the turbo expander for generating the electricity through working, the generated electric energy is used for compensation of electric devices (electric heaters and booster pumps) of the system, the remaining electric energy may be sold to generate revenue. The recovered heat energy of the reaction fluid discharged from the reactor may also be used to pre-heat the fuel and the oxidant. The finally recovered salts may be used as industrial raw materials.

The above embodiments only express several implementation modes of the disclosure, and the description thereof is relatively specified and detailed, but it is not understood as limitation to the scope of the disclosure patent. It is to be noted that a plurality of modifications and improvements may also be made by those of ordinary skill in the art without departing from the concept of the disclosure, and all of these modifications and improvements fall within the scope of protection of the disclosure. Therefore, the scope of protection of the disclosure patent should be subject to the appended claims.

What is claimed is:

1. A system for treating high-salt high-organic wastewater and recovering energy, wherein the system comprises a cold wall-type reactor, a multi-level cyclone separator, a waste liquid feeding system, an oxidant feeding system and a fuel feeding system;

the cold wall-type reactor is a double-layer housing structure, the top and bottom of the double-layer housing structure are provided with cooling medium inlets, a side portion of the double-layer housing is provided with a cooling medium outlet, an inner pipe is installed at the center of the top of the double-layer housing structure, the exterior of the inner pipe is provided with an intermediate pipe, the exterior of the intermediate pipe is provided with an outer pipe, the inner pipe, the intermediate pipe and the outer pipe are respectively provided with a fuel inlet, an oxidant inlet and a waste liquid inlet; the bottom of the double-layer housing is further provided with a reaction fluid outlet; the cold wall-type reactor is used to perform a supercritical water oxidation reaction on waste liquid; and the reaction fluid outlet is connected with a buffer tank, a top outlet of the buffer tank is connected with the multi-level cyclone separator;

the multi-level cyclone separator is used to perform steam recovery on a reaction product from the cold wall-type reactor and salt separation and crystallization of inorganic salts;

the waste liquid feeding system comprises an organic waste liquid regulating pool, the organic waste liquid regulating pool is connected with the waste liquid inlet on the outer pipe;

the oxidant feeding system comprises an oxidant storage tank, the oxidant storage tank is connected with the oxidant inlet on the intermediate pipe; and the fuel feeding system comprises a fuel storage tank, the fuel storage tank is connected with the fuel inlet on the inner pipe.

2. The system for treating the high-salt high-organic wastewater and recovering the energy as claimed in claim 1, wherein the inner pipe is 100-200 mm in length, the intermediate pipe is 50-150 mm longer than the inner pipe, and the outer pipe is 50-150 mm longer than the intermediate pipe.

3. The system for treating the high-salt high-organic wastewater and recovering the energy as claimed in claim 2, wherein a part, 50-150 mm greater than the intermediate pipe, of the outer pipe is a porous structure.

4. The system for treating the high-salt high-organic wastewater and recovering the energy as claimed in claim 1, wherein the multi-level cyclone separator is 2 to 4-level cyclone separators.

5. The system for treating the high-salt high-organic wastewater and recovering the energy as claimed in claim 4, wherein the multi-level cyclone separator is a 3-level cyclone separator, and a structure thereof specifically comprises: a first heat exchanger, a second heat exchanger, a third heat exchanger, a fourth heat exchanger, a first cyclone separator, a second cyclone separator, a third cyclone separator and a fourth cyclone separator, a discharge port of the first heat exchanger is connected with a feeding port of the first cyclone separator, a water inlet of the first heat exchanger is respectively connected with a water outlet of the first cyclone separator and a water outlet of the fourth heat exchanger; a discharge port of the first cyclone separator is connected with a feeding port of the second heat exchanger, a high pressure steam outlet of the first cyclone separator is connected with a feeding port of the fourth heat exchanger, and a water inlet of the first cyclone separator is connected with a water outlet of the second heat exchanger; a discharge port of the second heat exchanger is connected with a feeding port of the second cyclone separator, and a water inlet of the second heat exchanger is connected with a water outlet of the third heat exchanger; a high pressure steam outlet of the second cyclone separator is connected with a feeding port of the third heat exchanger; a discharge port of the third heat exchanger is connected with a feeding port of the third cyclone separator, and a water outlet of the third heat exchanger is connected with a water inlet of the fourth heat exchanger; and a discharge port of the fourth heat exchanger is connected with a feeding port of the fourth cyclone separator.

6. The system for treating the high-salt high-organic wastewater and recovering the energy as claimed in claim 5, wherein the multi-level cyclone separator further comprises a fifth heat exchanger and a sixth heat exchanger, a feeding port of the fifth heat exchanger is connected with a discharge port of the oxidant storage tank, a water inlet of the fifth heat exchanger is connected with a water outlet of the first heat exchanger, a discharge port of the fifth heat exchanger is connected with the oxidant inlet, and a water outlet of the fifth heat exchanger is connected with a water inlet of the third heat exchanger; a feeding port of the sixth heat exchanger is connected with a discharge port of the fuel storage tank, a water inlet of the sixth heat exchanger is connected with a water outlet of the first heat exchanger, a discharge port of the sixth heat exchanger is connected with the fuel inlet, and a water outlet of the sixth heat exchanger is connected with a water inlet of the third heat exchanger.

7. The system for treating the high-salt high-organic wastewater and recovering the energy as claimed in claim 6, wherein connecting pipes between the fifth heat exchanger and the oxidant inlet and between the sixth heat exchanger and the fuel inlet are further provided with heaters.

8. The system for treating the high-salt high-organic wastewater and recovering the energy as claimed in claim 1, wherein the system further comprises a residue removing tank, the residue removing tank is connected with a bottom outlet of the buffer tank.

9. The system for treating the high-salt high-organic wastewater and recovering the energy as claimed in claim 1, wherein the system further comprises a turbo expander connected with a cooling pipeline of the cold wall-type reactor, and the turbo expander is successively connected with a cooling device, a cooling water circulation pump and a cooling medium pipeline, as to form a cycle.

10. The system for treating the high-salt high-organic wastewater and recovering the energy as claimed in claim 9, wherein the turbo expander is further connected with an electric generator for generating electricity through expansion work.

11. A system for treating high-salt high-organic wastewater and recovering energy, wherein the system comprises a cold wall-type reactor, a multi-level cyclone separator, a waste liquid feeding system, an oxidant feeding system and a fuel feeding system;

the cold wall-type reactor is a double-layer housing structure, the top and bottom of the double-layer housing are respectively provided with two cooling medium inlets, two side portions of the double-layer housing are respectively provided with a cooling medium outlet, a connecting line of the two cooling medium inlets at the top is respectively 90 degrees with a connecting line of the two cooling medium inlets at the bottom and a connecting line of the two cooling medium outlets at the two side portions, an inner pipe is installed at the center of the top of the double-layer housing structure, the exterior of the inner pipe is provided with an intermediate pipe, the exterior of the intermediate pipe is provided with an outer pipe, the inner pipe, the intermediate pipe and the outer pipe are respectively provided with a fuel inlet, an oxidant inlet and a waste liquid inlet; the bottom of the double-layer housing is further provided with a reaction fluid outlet; the cold wall-type reactor is used to perform a supercritical water oxidation reaction on waste liquid; and the reaction fluid outlet is connected with a buffer tank, a top outlet of the buffer tank is connected with the multi-level cyclone separator;

the multi-level cyclone separator is used to perform steam recovery on a reaction product from the cold wall-type reactor and salt separation and crystallization of inorganic salts;

the waste liquid feeding system comprises an organic waste liquid regulating pool, the organic waste liquid regulating pool is connected with the waste liquid inlet on the outer pipe;

the oxidant feeding system comprises an oxidant storage tank, the oxidant storage tank is connected with the oxidant inlet on the intermediate pipe; and the fuel feeding system comprises a fuel storage tank, the fuel storage tank is connected with the fuel inlet on the inner pipe.

12. The system for treating the high-salt high-organic wastewater and recovering the energy as claimed in claim 11, wherein the two cooling medium inlets at the bottom of the double-layer housing are symmetrically installed at left and right two sides of the reaction fluid outlet by using the reaction fluid outlet as a center.

\* \* \* \* \*